Figure 1:
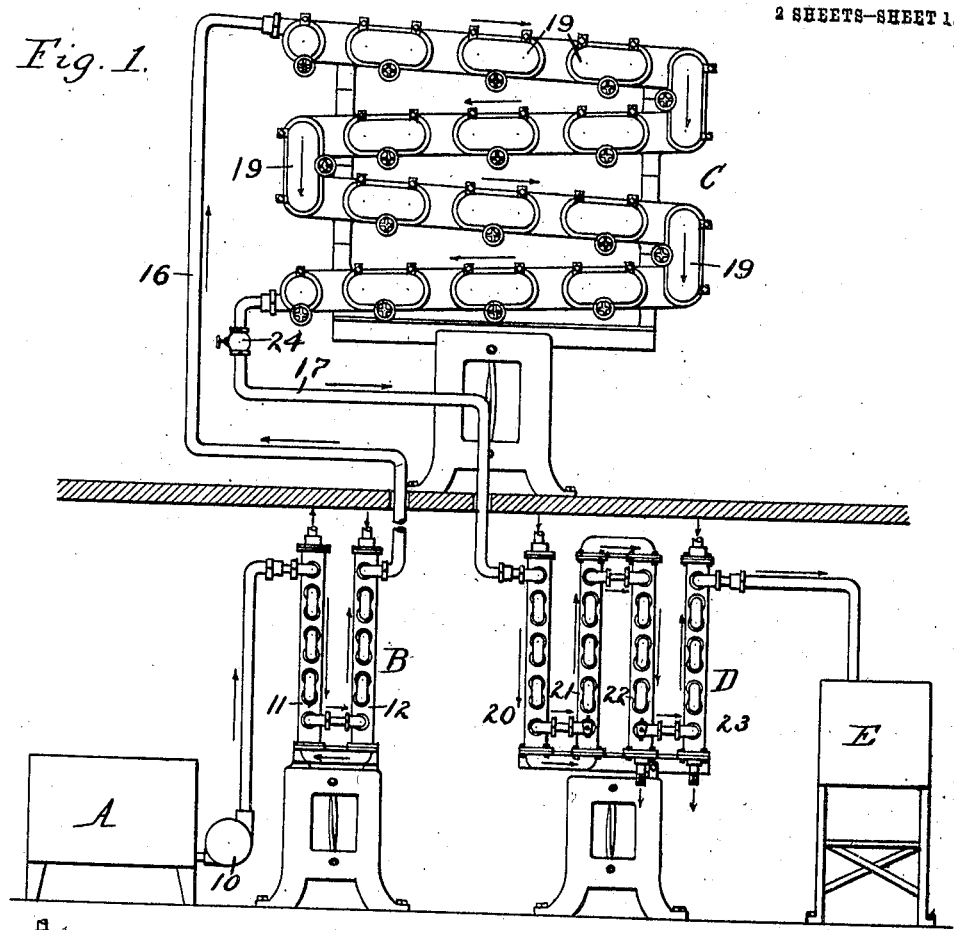

H. FELDMEIER & C. B. DALZELL.
PASTEURIZING APPARATUS.
APPLICATION FILED JUNE 9, 1911.

1,109,975.

Patented Sept. 8, 1914.

2 SHEETS—SHEET 1.

Witnesses:

Inventors

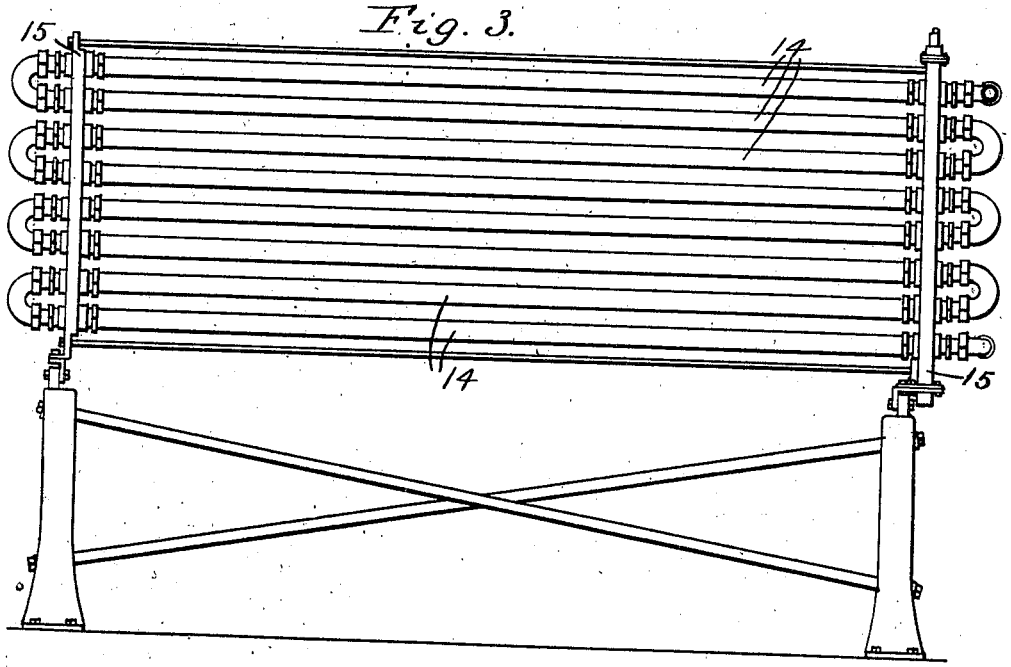
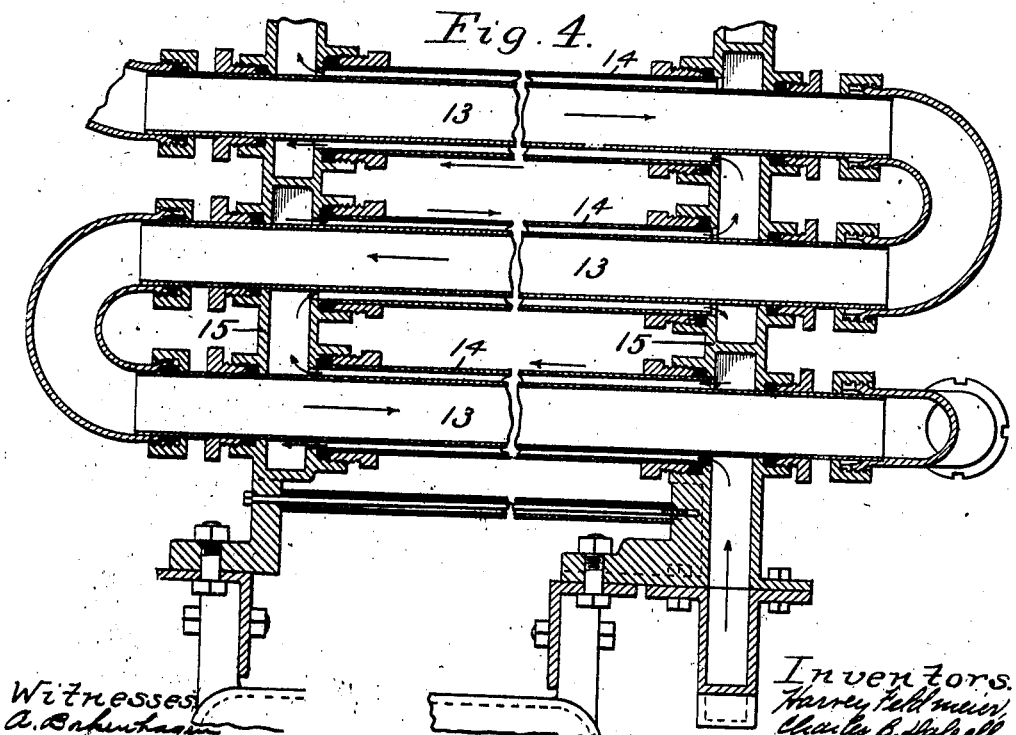

UNITED STATES PATENT OFFICE.

HARVEY FELDMEIER AND CHARLES B. DALZELL, OF LITTLE FALLS, NEW YORK, ASSIGNORS TO D. H. BURRELL & COMPANY, OF LITTLE FALLS, NEW YORK.

PASTEURIZING APPARATUS.

1,109,975.  Specification of Letters Patent.  Patented Sept. 8, 1914.

Application filed June 9, 1911. Serial No. 632,128.

*To all whom it may concern:*

Be it known that we, HARVEY FELDMEIER and CHARLES B. DALZELL, citizens of the United States, residing at Little Falls, in the county of Herkimer and State of New York, have invented a new and useful Improvement in Pasteurizing Apparatus, of which the following is a specification.

This invention relates to the pasteurization of milk and other liquids by first heating the liquid to the temperature necessary for pasteurization, in the case of milk usually from 140° to 150° F., then holding the liquid at this temperature for a sufficient length of time to produce the desired effect, usually from 20 to 30 minutes, and then cooling the liquid to the temperature suitable for filling the same in bottles or other vessels or containers, usually about 40° F. Heretofore in pasteurizing milk the holding of the milk at the pasteurizing temperature has been effected in various ways which permitted the milk to pass through the heater and the cooler without interrupting the flow through these parts of the apparatus, but in all of these known methods the holding is effected in such a way that the milk comes to a state of rest, either wholly or in part, as for instance, by causing the heated milk to collect in a vat or tank in which the milk remains to a greater or less extent during the pasteurizing period, or by causing the milk to collect in compartments which are successively filled and emptied.

The object of this invention is to provide a simple apparatus for holding the heated milk or other liquid for the desired length of time in such manner that all particles of the heated liquid are held practically for the same length of time and no part of the liquid is allowed to escape before that period has expired or is held beyond that period, and without allowing any portion of the liquid to come to a state of rest. To that end the heated liquid is caused to flow through a holder formed by a coil or tube, and the size of the coil or tube and the velocity of the flow are so regulated that the liquid in flowing through the holder occupies the length of time during which the liquid is required to be held at the pasteurizing temperature and forms a moving body or stream in which all particles move forwardly with practically the same speed and in which, therefore, neither eddies, counter currents or stagnant bodies are formed which would retard the movement of the liquid, nor accelerated secondary currents which would cause part of the liquid to flow through the holder in less time than the desired period.

Figure 2:
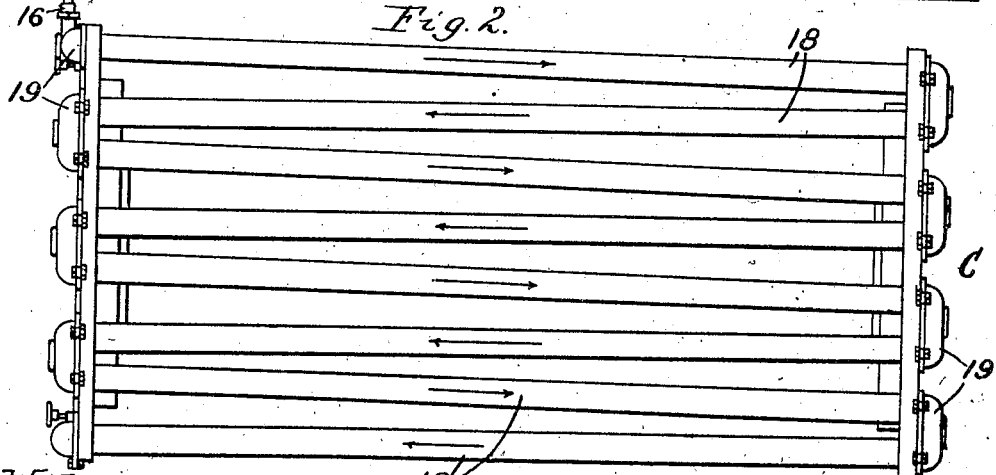

In the accompanying drawings: Figure 1 is a diagrammatic elevation of this improved pasteurizing apparatus. Fig. 2 is a top plan view of the holder. Fig. 3 is a side elevation of the heater or cooler. Fig. 4 is a fragmentary sectional view of the heater or cooler.

Like reference characters refer to like parts in the several figures.

The apparatus is herein described as being used for pasteurizing milk.

A represents the receptacle or tank for the milk to be pasteurized, from which the milk is supplied by a pump 10 or other suitable means to the heater B which may be composed of two sections 11 and 12 which are arranged side by side and through which the milk flows successively. This heater is preferably composed of connected internal tubes 13, through which the milk flows, and outer tubes 14 which surround the internal tubes and which are connected with headers 15 having flow passages by which adjacent internal tubes communicate in such manner that the heating liquid, which may be hot water, flows through the annular passages between the internal and outer tubes and the flow passages in the headers in the opposite direction to the flow of the milk.

C represents the tubular holder or holding coil which receives the heated milk, preferably at its upper end, from the heater B by a pipe 16 and from which the milk escapes at the lower end by a pipe 17. The holder consists of a coil or sinuous tube system arranged preferably in several sections, one above the other, and composed preferably of approximately parallel pipes 18 connected by return bends 19, the plane of each section being inclined to facilitate draining. The pipes or tubes of this coil are considerably larger in diameter than the milk pipe of the heater, so that the velocity of flow is considerably less in the holder than in the heater. An internal diameter of about 1¾ inches is suitable for the milk flow pipe of the heater and an internal diameter of 5¼ inches is suitable for the holder.

It has been found in practice that a speed of from 8 to 12 feet per minute in the holder causes the milk to flow through the same in a solid stream or moving body in which all particles of the milk flow forwardly with practically the same speed, so that neither eddies, cross currents or stagnant bodies nor accelerated secondary currents are formed and all of the liquid particles consume practically the same time in passing from the inlet to the outlet of the holder. If the speed is too slow the outermost portions of the liquid are greatly retarded and accelerated secondary currents are formed in the inner portion of the liquid which travel at a much greater speed than the rest of the liquid and reach the outlet in much less time, so that the liquid which forms these accelerated currents is not held at the pasteurizing temperature for the desired length of time, while other portions of the liquid are held much longer than the desired period, whereby a uniform action of the heat on the liquid is rendered impossible and the successful operation of the apparatus is defeated. The holder is made of such length that the milk occupies the desired period of time in passing from the inlet to the outlet of the holder. For illustration, if it is desired to hold the milk for thirty minutes and the speed of the milk in the flow passage of the holder is twelve feet per minute, the length of the passage should be three hundred and sixty feet. The speed of the flow through the heater and the cooler is proportionately greater, which is desirable as it promotes the exchange of temperature between the milk and the heating or cooling medium, while reducing the size of the apparatus.

D represents the cooler to which the milk passes from the holder through the pipe 17 and in which the milk is cooled to the temperature suitable for bottling or storing. This cooler is constructed preferably like the heater of connected internal tubes and outer tubes connected by headers and is arranged in several sections 20, 21, 22, 23, side by side. The milk passes from the last section 23 to a suitable receiving tank E which may be the tank of the bottle filler.

In the operation of this apparatus the cold milk, having a temperature of about 60° F., is heated in flowing through the heater B to the desired pasteurizing temperature, usually from 140° to 150° F., and passes with this temperature to and through the tubular holder in which this temperature is practically maintained while the milk flows through the holder, the milk losing but a few degrees in temperature as the holder is suitably insulated or protected against loss of heat. In starting the apparatus the discharge cock 24 at the tail end of the holding coil is kept closed until the holder has been filled and the milk is supplied to the coil with such speed that in filling the coil the period of time is occupied which is required for pasteurization, say thirty minutes. When the holder is full the discharge cock is opened and thereafter the milk flows through the holder with such speed that each milk particle occupies the desired holding period in flowing from the inlet to the outlet of the holding coil. The time during which the milk is required to be held at the pasteurizing temperature varies somewhat with the temperature which is employed. For illustration, with a temperature of 140° F. a holding period of thirty minutes is suitable, while with a temperature of 150° F. a period of twenty-five minutes is sufficient.

The milk is kept in motion while passing through all parts of the apparatus, thereby avoiding a partial separation of the cream and the formation of foam, which are liable to take place when the milk is allowed to come to a state of rest. Furthermore, the coating of the pipes is avoided and the milk is thoroughly and uniformly acted upon. The milk can be forced through the entire apparatus, heater, holder and cooler, by a single pump or by gravity, since all of these parts form a single tubular passage through which the milk flows without interruption or coming to a state of rest and through which the milk can be caused to flow at a predetermined speed. The apparatus is simple and efficient and contains no moving parts. If desired, all of the parts of the apparatus may be arranged on the same level.

In referring herein to milk we intend to include also other similar liquids, for instance, cream, skimmilk, buttermilk, &c. The apparatus may also be employed for pasteurizing or sterilizing other liquids, for instance, beer or water.

The apparatus may be provided with the regenerating means disclosed by Patent No. 972,608, October 11, 1910.

We claim as our invention:

1. In a pasteurizing apparatus, the combination with a heater and a cooler, of an interposed holder which is independent of said heater and cooler and which consists of a tube through which the liquid flows from the heater to the cooler and which is of such length that the heated liquid in flowing through the holder occupies the necessary time for pasteurization and of such cross sectional area that practically all particles of the liquid flow through such area in the same direction and with the same speed.

2. In a pasteurizing apparatus, the combination with a tubular heater and a tubular cooler, of an interposed holder which is independent of said heater and cooler and which consists of a tube through which the liquid flows from the heater to the cooler and which is of such length that the heated liquid in flowing through the holder occuies the necessary time for pasteurization and of such cross sectional area that practically all particles of the liquid flow through such area in the same direction and with the same speed, said heater, holder and cooler forming a continuous flow passage through which the milk flows in a confined stream.

Witness our hands in the presence of two subscribing witnesses.

HARVEY FELDMEIER.
CHARLES B. DALZELL.

Witnesses:
GRIFFITH PRICHARD,
CELIA WOODARD.